United States Patent [19]

Nowicki

[11] Patent Number: 5,123,449
[45] Date of Patent: Jun. 23, 1992

[54] SELECTOR VALVE

[75] Inventor: Michael L. Nowicki, House Springs, Mo.

[73] Assignee: Dema Engineering Company, St. Louis, Mo.

[21] Appl. No.: 663,286

[22] Filed: Feb. 28, 1991

Related U.S. Application Data

[63] Continuation of Ser. No. 428,228, Oct. 20, 1989, abandoned.

[51] Int. Cl.⁵ ............................................. F16K 5/10
[52] U.S. Cl. ........................... 137/625.11; 137/625.3; 137/625.31; 251/208; 251/297
[58] Field of Search .......... 137/625.11, 625.3, 625.31; 251/205, 208, 297

[56] References Cited

U.S. PATENT DOCUMENTS

| | | | |
|---|---|---|---|
| 2,649,113 | 8/1953 | Cizek | 137/625.11 X |
| 2,912,011 | 11/1959 | Burg | 137/625.31 X |
| 3,067,768 | 12/1962 | Burg | 137/625.31 X |
| 3,072,137 | 1/1963 | McDougall | 137/216 |
| 3,089,505 | 5/1963 | Forster | 137/270 |
| 3,166,086 | 1/1965 | Holmes | 137/217 |
| 3,240,230 | 3/1966 | Callahan, Jr. | 137/608 |
| 3,256,909 | 6/1966 | Obidniak et al. | 137/625.31 |
| 3,586,049 | 6/1971 | Adamson | 137/625.41 |
| 3,687,163 | 8/1972 | Nickels | 137/625.11 |
| 3,762,439 | 10/1973 | Heath | 137/549 |
| 3,940,107 | 2/1976 | Allenbaugh | 251/297 |
| 3,957,082 | 5/1976 | Fuson et al. | 137/625.41 |
| 4,178,963 | 12/1979 | Riefler et al. | 137/624.18 |
| 4,241,896 | 12/1980 | Voege | 251/208 X |
| 4,407,444 | 10/1983 | Knebel et al. | 236/12.1 |
| 4,427,176 | 1/1984 | Livet | 251/68 |
| 4,538,636 | 9/1985 | Cleland | 137/216 |
| 4,643,215 | 2/1987 | Philpot et al. | 251/208 X |
| 4,794,950 | 1/1989 | Gratzmuller | 137/596.18 |

Primary Examiner—John Rivell
Attorney, Agent, or Firm—Cohn, Powell & Hind

[57] ABSTRACT

This selector valve (20) may be used to control flow from a chemical supply (22) and a proportioner (14) attached to a faucet (12). The valve includes a valve body (30) having a central passage (32) receiving a rotatable stem assembly (38) having a stem (40) provided with interior passages (94, 96). The stem passages (94, 96) selectively communicate between an inlet line (18) and any one of a plurality of transverse intermediate passages (44, 46 and 48), or a transverse outlet passage (50), and an outlet line (16) depending on the rotational position of said stem (40). Each intermediate passage (44, 46 and 48) includes a metering adaptor (54, 56 and 58) and the outlet passage (50) also includes a metering adaptor (60). When the stem passages (96) is aligned with the metering adaptor (54, 56 and 58) of an intermediate passage (44, 46 and 48) fluid flows through that adaptor by way of connecting passages (102, 100, 104 and 87) to the outlet line (16). When the stem passage (96) is aligned with the metering adaptor (60) of the outlet passage (50) fluid flows through that adaptor directly to the outlet line (16).

12 Claims, 1 Drawing Sheet

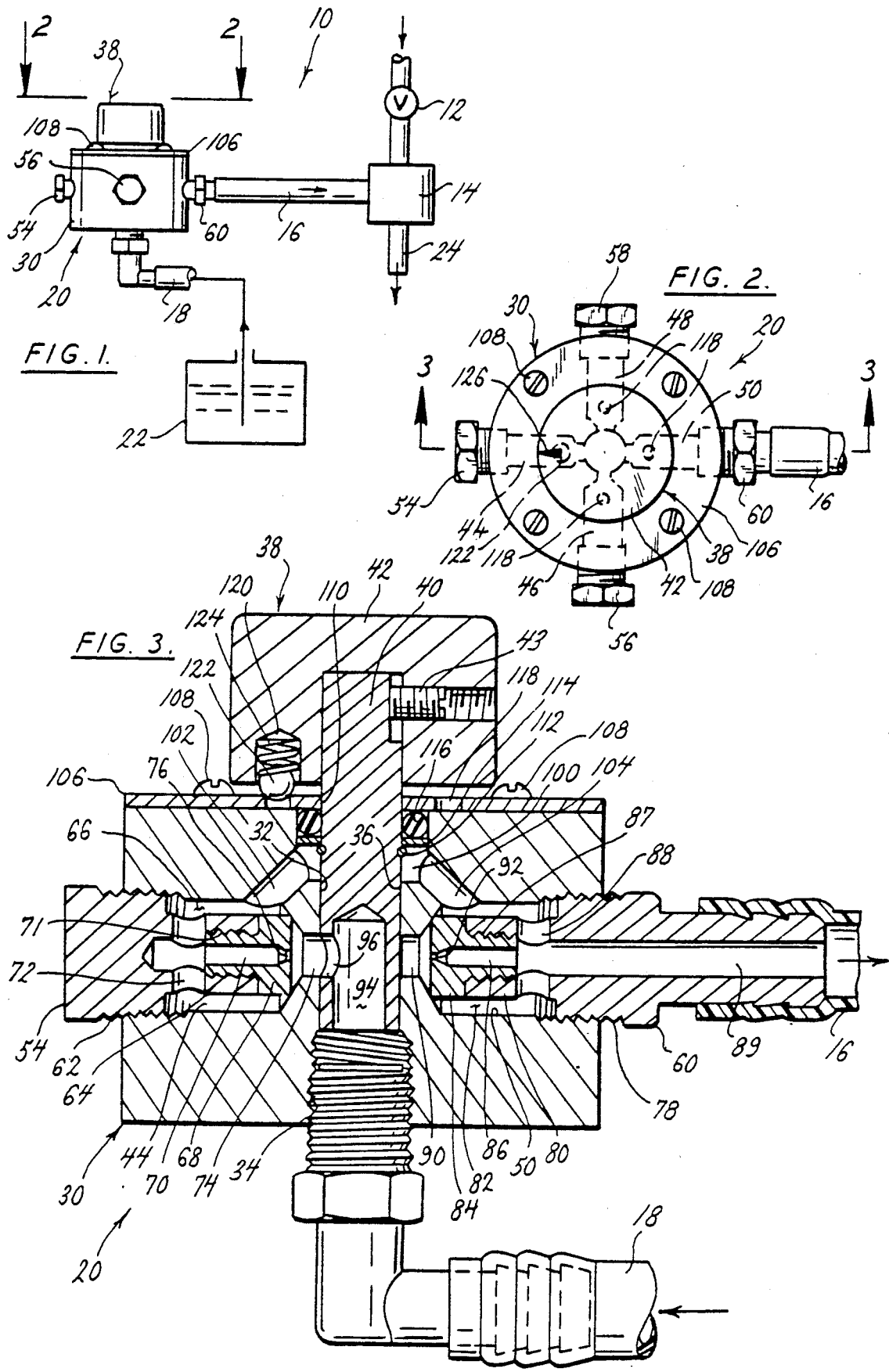

SELECTOR VALVE

This is a continuation of co-pending application Ser. No. 07/428,228 filed on Oct. 20, 1989 now abandoned.

BACKGROUND OF THE INVENTION

This invention relates generally to a selector valve for controlling flow through a fluid supply line and more particularly to the use of such a valve to selectively predetermine the amount of liquid additive supplied to a proportioner-actuated water line.

It is very common to provide liquid chemicals in concentrated form so that they must be diluted with water prior to use. In particular, this applies to cleaning chemicals and it is conventional to connect a line from a liquid chemical supply to a pushbutton-controlled proportioner which is attached to a water supply such as a water faucet. The proportioner, such as that disclosed in U.S. Pat. No. 3,166,086, is actuated by depressing a button and water from the faucet creates a negative pressure which draws chemical into the proportioner for blending or mixing with the water, the dilutant mix being discharged from the proportioner into a container such as a cleaning pail. By placing a selector valve between the liquid chemical supply and the proportioner it is possible to control the flow of liquid chemical from the supply and therefore determine the degree of dilution more accurately than is possible using the proportioner alone.

Selector valves are known in the prior art. For example, U.S. Pat. No. 3,687,163 discloses a selector valve which can be used to provide a stationary input port connected to one of a choice of several output ports. A rotary valve member is provided having a single port connected to the output ports by means of a stationary annular cage having sealed openings. With this device multiple output ports are required.

U.S. Pat. No. 3,586,049 discloses an oscillatory valve by which one of several selected inlet lines is connected to an outlet line through the medium of a rotating valve member having an arrangement of radial passages and a cooperating housing. When one of the passages is aligned to connect the chosen inlet with the outlet the other passages are closed by the valve housing. With this valve multiple inlet ports are required and the aim is not to control flow rate from a supply but rather to select a particular supply.

SUMMARY OF THE INVENTION

This selector valve is insertable into a fluid supply line to predetermine the amount of fluid flowing through the line and can be inserted into the line between a liquid chemical supply and a proportioner-controlled water line to provide a means of accurately controlling the flow of liquid chemical to the water line.

The selector valve provides a rotatable valve member which selectively aligns metering passges, within the valve, with the valve input to predetermine the valve output and is operated by means of a manually rotated control knob between a plurality of settings each adjusting the valve to meter a predetermined amount of liquid through the valve.

The valve includes metering adaptors which supply liquid chemical either indirectly, through an intermediate adaptor, to the outlet line or directly to the outlet line through a metering adaptor in the outlet passage.

It is an aspect of this invention to provide a selector valve comprising a valve body including a first passage having an inlet portion and a stem-receiving portion, a second passage having an outlet portion, a plurality of intermediate passages, each having an inner end communicating with said first passage stem receiving portion, and connecting passage means communicating between said intermediate passages and said second passage; a rotatable stem received within the first passage stem-receiving portion and including passage means having one end communicating with said first passage inlet portion and the other end selectively communicating with each intermediate passage as the stem is rotated, and metering means within each intermediate passage controlling flow from said stem passage means into a selected intermediate passage when said stem passage means is rotated into aligned relation with said intermediate passage.

It is another aspect of this invention to provide that the stem passage means includes an axial passage communicating with said first passage inlet portion and a connecting transverse passage communicating with said selected intermediate passage.

It is still another aspect of this invention to provide that the stem includes a fixedly attached knob, said knob including means indicating alignment between said stem passage means and said selected intermediate passage.

It is yet another aspect of this invention to provide an adaptor means threadedly received into each intermediate passage, each adaptor means including a metering passage of a predetermined size communicating between said stem passage means and said valve body connecting passage means.

One aspect of this invention is to provide that each adaptor means includes a reduced inner portion cooperating with its associated intermediate passage to define an annular cavity communicating with said valve body connecting passage means, and to provide that each adaptor means metering passage includes an axial passage and a connecting transverse passage communicating with said annular cavity and another aspect is to provide that each adaptor means includes a threadedly attached metering tip providing said axial passage, said axial passage being of said predetermined size to perform said metering function.

Still another aspect of this invention is to provide that said valve body connecting passage means includes an annular cavity disposed about said stem, a plurality of connecting passages, one of said passages communicating between said cavity and said second passage and each of the other of said passages communicating between said cavity and an associated intermediate passage, and another aspect to provide that said connecting passages are disposed in angular relation to the axis of rotation of said stem.

Yet another aspect of this invention is to provide that said second passage includes an inner end communicating with said first passage stem-receiving portion and selectively communicating with said other end of said stem passage means as said stem is rotated, and to provide metering means within said second passage controlling flow from said stem passage means into said second passage when said stem passage means is rotated into aligned relation with said second passage inner end.

It is an aspect of this invention that a plurality of transverse passages provide said intermediate passages and said second passage and that adaptor means are threadedly received within each transverse passage, each adaptor means including a metering passage of pre-determined size communicating between said stem passage means and said valve body connecting means and controlling flow from said stem passage means into said transverse passage when said stem passage means is rotated into aligned relation with said transverse passage, each of said adaptor means, except said adaptor means in said transverse passage providing said second passage, having a closed outer end.

It is another aspect of this invention to provide that said valve body includes a removable cover plate having a plurality of indentations aligned with said transverse metering passages and said stem knob includes an upper portion and a lower portion, said lower portion including a biased ball selectively receivable by said indentations and said upper portion including an indicator mark, said mark and said ball cooperating with said indentations to indicate the selected metering means.

It is an aspect of this invention to provide a selector valve which is relatively simple and inexpensive to manufacture and highly efficient in operation.

BRIEF DESCRIPTION OF THE DRAWINGS

FIG. 1 is a mixing or blend system utilizing the selector valve of the present invention;

FIG. 2 is a plan view of the selector valve taken on line 2—2 of FIG. 1, and

FIG. 3 is a cross-sectional view of the selector valve taken on line 3—3 of FIG. 2.

DESCRIPTION OF THE PREFERRED EMBODIMENT

Referring now by reference numerals to the drawing and first to FIG. 1, it will be understood that the blend system generally indicated by numeral 10 includes a valve-controlled water supply such as a faucet 12 which flows through a proportioner 14 and creates a suction in lines 16 and 18 which are provided with a selector valve 20 and are connected to a liquid chemical supply 22. The selector valve 20 provides a means of controlling flow of liquid chemical to the proportioner 14 thus determining the water/chemical mix issuing from the proportioner output 24 which can be used to fill mop buckets, for example, with cleaning fluid of a predetermined dilution. The selector valve 20 will now be described with particular reference to FIG. 3.

The selector valve 20 includes a valve body 30 having a central passage 32 constituting a first passage and including a lower chemical inlet portion 34 communicating with outlet line 18, and an upper portion 36. A rotatable stem assembly 38 is mounted to the valve body 30 and includes a stem 40 which is received in rotatable relation within the central passage upper portion 36 and a knob 42 which is fixedly attached to the stem by a set screw 43. The valve body 30 also includes a plurality of transverse passages, four (4) in number in the preferred embodiment, which communicate with the central passage 32 at their inner end. The transverse passages include three (3) intermediate passages 44, 46 and 48 and a transverse outlet passage 50 as shown in FIG. 2. Passages 44, 46 and 48 each include closed end adaptor plugs 54, 56 and 58 which serve a metering function and are identical except as to the size of a metering passage and will be described with respect to adaptor plug 54. The outlet passage 50, which constitutes a second passage, includes an open end adaptor plug 60 which is similar to plugs 54, 56 and 58 in other respects.

Adaptor plug 54 (56 and 58) includes a threaded outer end 62 and a reduced diameter inner end 64 which cooperates with the transverse intermediate passage 44 to define an annular cavity 66. The plug inner end 64 includes a metering tip 68 having an axial passage 70, said tip 68 being threadedly received within an opening 71 which communicates with a transverse passage 72. Interconnected passages 70 and 72, which constitute a metering passage, communicate between the annular cavity 66 and a reduced portion 74 of the transverse intermediate passage 44 which in turn communicates with the stem-receiving portion 36 of the central passage 32. Each metering passage axial portion 70 is reduced at its inner end to provide a metering orifice 76 of a predetermined size. The metering orifice of each metering tip 68 is associated with a transverse passage 44, 46 and 48.

Adaptor plug 60 includes a threaded outer end 78 and a reduced diameter inner end 80 which cooperates with the transverse outer passage 50 to define an annular cavity 82. The adaptor plug inner end 80 includes a metering tip 84 having an axial passage 86, said tip being threaded received within an opening 87. Axial passage 86 communicates with a transverse passage 88, and includes a portion 89 which extends outwardly therebeyond to communicate with line 16. Interconnected passages 86 and 88, passage 86 constituting a metering passage, communicate between the annular cavity 82 and a reduced portion 90 of the transverse outlet passage 50, which in turn communicates between the stem-receiving portion 36 of the central passage 32. The metering passage 86 is reduced at its inner end to provide a metering orifice 92 which is of a different predetermined size to the metering orifices 76 associated with the transverse intermediate passages 44, 46 and 48.

The transverse intermediate passages 44, 46 and 48 and the transverse outlet passage 50 are selectively connected to the central passage inlet portion 34 through the stem 40, which includes an axial passage 94 communicating with said inlet portion 34, and a connected transverse passage 96. Stem passage 96 is selectively connected to each of said transverse passages 44, 46, 48 and 50, as the stem 40 is rotated and hence to the metering tips 68 and 84 associated with said transverse intermediate passages 44, 46 and 48, and with said outlet transverse passage 50, respectively. The transverse intermediate passages 44, 46 and 48 are connected to the transverse outlet passage 50 by connecting passage means which, in the preferred embodiment, include an annular cavity 100, disposed about said stem 40. The connecting passage means also includes passages 102 connected between said cavity 100 and intermediate transverse passage 44, 46 and 48, by way of associated annular cavities 66, and passage 104 connected between said cavity 100 and outlet passage 50, by way of associated annular cavity 82. In the embodiment shown, passages 102 and passage 104 are disposed in inclined relation to the rotational axis of the stem 40, which facilitates the formation of said passages.

The valve body 30 includes a cover plate 106, attached thereto as by fasteners 108, and having a central opening 110. The stem assembly 38 is held in place within the valve body central opening 32 by means of a snap ring 112, a washer 114 and a sealing ring 116 sandwiched between said washer 114 and said ring 116. The cover plate 106 includes a plurality of openings 118 corresponding in number to the number of metering tips 68, 84 and arranged to lie on the axes of the orifices of said metering tips. The underside of the stem assembly cap 42 includes a socket 120 receiving a ball 122 and a biasing spring 124 and vertically aligned with the axis of the transverse passage 96 in the stem 40. With this structural arrangement of parts the indentations provided by said cover plate openings 118 tend to retain the ball when said transverse passage 96 is vertically aligned with a metering tip. The upper side of the cap 42 includes an arrow 126 or similar indicia which is vertically aligned with the ball 120.

Since the outlet transverse passage 50, as well as the intermediate transverse passages 44, 46 and 48, includes a metering tip, and each has a different predetermined size, there are four (4) selections of flow rate possible by the utilization of the selector valve 20 inserted between the proportioner 14 and the liquid chemical supply 22. In order to select the desired orifice it is simply a matter of rotating the stem 40 by means of the knob 42 until the arrow 126 is disposed in aligned relation with the desired metering orifice.

When the arrow 126 is aligned with a metering tip 68 associated with an intermediate passage 44, 46 or 48, the flow from the inlet portion 34, of the central aperture 32, is directed into the stem axial passage 94 and, by way of the stem transverse passage 96, into the selected metering tip orifice 76. The fluid entering metering orifice 76 passes through metering passages 70 and 72, annular cavity 66, connecting passage 102 and into annular cavity 100. Fluid then passes from annular cavity 100 into connecting passage 104, annular cavity 82, transverse passage 88 of metering tip 84 and into the axial passage 89 which communicates directly with line 16. It will be understood that during this operation the orifice 92 of the metering tip 84 is effectively closed and said metering tip 84 is not providing a metering function. The metering tips of the other intermediate passages 46 and 46 are likewise effectively closed. It will also be understood that when the arrow 126 and stem transverse passage 96 are aligned with metering tip orifice 92 there is a direct flow through the metering tip 84 into axial passage 86, extension passage 89, and line 16.

Although the selector valve has been described by making detailed reference to a preferred embodiment, the details of description are not to be understood as restrictive numerous variants being possible within the scope of the claims hereunto appended. For example, the metering tip 84 in the outlet passage 60 can be omitted and the passage portion 90 also omitted so that passage 60 performs as an outlet passage only with no metering function.

I claim as my invention:

1. A selector valve comprising:
(a) a valve body including:
1. a first passage having an inlet portion and a stem-receiving portion,
2. a second passage having an outlet portion,
3. a plurality of intermediate passages, each having an inner end communicating with said first passage stem receiving portion, and
4. connecting passage means communicating between said intermediate passages and said second passage,
(b) a rotatable stem received within the first passage stem-receiving portion and including passage means having one end communicating with said first passage inlet portion and the other end selectively communicating with each transverse passage as the stem is rotated, and
(c) metering means within each intermediate passage controlling flow from said stem passage means into a selected intermediate passage when said stem passage means is rotated into aligned relation with said intermediate passage,
(d) the stem passage means including an axial passage communicating with said first passage inlet portion and a connecting transverse passage communicating only with a selected intermediate passage.

2. A selector valve comprising:
(a) a valve body including:
1. a first passage having an inlet portion and a stem-receiving portion,
2. a second passage having an outlet portion,
3. a plurality of intermediate passages, each having an inner end communicating with said first passage stem receiving portion, and
4. connecting passage means communicating between said intermediate passages and said second passage,
(b) a rotatable stem received within the first passage stem-receiving portion and including passage means having one end communicating with said first passage inlet portion and the other end selectively communicating with each intermediate passage as the stem is rotated,
(c) metering means within each intermediate passage controlling flow from said stem passage means into a selected intermediate passage when said stem passage means is rotated into aligned relation with said intermediate passage, and
(d) an adaptor means threadedly received into each intermediate passage, each adaptor means including a metering passage of a predetermined size communicating between said stem passage means and said valve body connecting passage means,
(e) each adaptor means including a reduced inner portion cooperating with its associated intermediate passage to define an annular cavity communicating with said valve body connecting passage means, and each adaptor means metering passage including an axial passage and a connecting transverse passage communicating with said annular cavity.

3. A selector valve as defined in claim 2, in which:
(f) each adaptor means includes a threadedly attached metering tip providing said axial passage, said axial passage being of said predetermined size to perform a metering function.

4. A selector valve comprising:
(a) a valve body including:
1. a first passage having an inlet portion and a stem-receiving portion,
2. a second passage having an outlet portion,
3. a plurality of intermediate passages, each having an inner end communicating with said first passage stem receiving portion, and
4. connecting passage means communicating between said intermediate passages and said second passage,
(b) a rotatable stem received within the first passage stem-receiving portion and including passage means having one end communicating with said first passage inlet portion and the other end selectively communicating with each intermediate passage as the stem is rotated, and (c) metering means within each intermediate passage controlling flow from said stem passage means into a selected intermediate passage when said stem passage means is rotated into aligned relation with said intermediate passage, (d) said second passage including an inner end communicating with said first passage stem-receiving portion and selectively communicating with said other end of said stem passage means as said stem is rotated, and (e) metering means provided within said second passage controlling flow from said stem passage means into said second passage when said stem passage means is rotated into aligned relation with said second passage inner end.

5. A selector valve comprising:
(a) a valve body including:
   1. a first passage having an inlet portion and a stem receiving portion,
   2. a plurality of passages transverse to said first passage, each having an inner end communicating with said first passage stem receiving portion, one of said transverse passages providing an outlet passage, and
   3. connecting passage means communicating between said transverse passages,
(b) a rotatable stem received within the first passage stem-receiving portion and including passage means having one end communicating with said first passage inlet portion and the other end selectively communicating with each transverse passage as the stem is rotated, and
(c) adaptor means threadedly received within each transverse passage and including a metering passage of pre-determined size communicating between said stem passage means and said valve body connecting means and controlling flow from said stem passage means into a selected transverse passage when said stem passage means is rotated into aligned relation with said transverse passage, each of said adaptor means, except said adaptor means in said transverse passage providing said outlet passage, having a closed outer end.

6. A selector valve as defined in claim 5, in which:
(d) each adaptor means includes a reduced inner portion cooperating with its associated transverse passage to define an annular cavity communicating with said valve body connecting passage means, and each adaptor means metering passage includes an axial passage and a connecting transverse passage communicating with said annular cavity, each adaptor means including a removable metering tip providing said axial passage, said axial passage being of a predetermined size to perform a metering function.

7. A selector valve as defined in claim 5, in which:
(d) said valve body connecting passage means includes an annular cavity disposed about said stem and a plurality of connecting passages, one of said passages communicating between said cavity and said transverse passage having said outlet portion and each of the other of said passages communicating between said cavity and an associated other transverse passage, said connecting passages being disposed in angular relation to the axis of rotation of said stem.

8. A selector valve as defined in claim 5, in which:

(d) the stem passage means includes an axial passage communicating with said first passage inlet portion and a connecting transverse passage communicating with a selected metering passage, and (e) said stem includes a fixedly attached knob, said knob including means indicating alignment between said stem transverse passage and a selected metering passage.

9. A selector valve as defined in claim 8, in which:
(f) said valve body includes a removable cover plate having a plurality of indentations aligned with said transverse metering passages and said knob includes an upper portion and a lower portion, said lower portion including a biased ball selectively receivable by said indentations and said upper portion including an indicator mark, said mark and said ball cooperating with said indentations to indicate a selected metering means.

10. A selector valve comprising:
(a) a valve body including:
   1. a first passage having a fluid inlet portion and a stem-receiving portion,
   2. a second passage having an outlet portion,
   3. a plurality of intermediate passages, each having an inner end communicating with said first passage stem receiving portion, and
   4. connecting passage means communicating between said intermediate passages and said second passage,
(b) a rotatable stem received within the first passage stem-receiving portion, the rotatable stem being provided with a stem transverse passage having an inlet permitting fluid flow from the first passage inlet portion, and an outlet permitting fluid flow to an intermediate passage,
(c) means selectively positioning the stem transverse passage outlet opposite one of the intermediate passages so that fluid passes through the stem transverse passage to only that intermediate passage, and
(d) metering means disposed in each intermediate passage, each including a metering passage of pre-determined size selectively providing a different fluid flow rate through each intermediate passage and into said outlet passage as said stem is rotated.

11. A selector valve comprising:
(a) a valve body including:
   1. passage means including a stem-receiving passage,
   2. an inlet passage operatively communicating with said passage means, and
   3. an outlet passage operatively communicating with said passage means,
(b) a rotatable stem received within said stem-receiving passage and including stem passage means operatively communicating with said valve body passage means, and
(c) one of said valve body passage means and stem passage means including a plurality of intermediate passages each including metering means providing a metering passage of predetermined size selectively providing a different fluid flow rate through each intermediate passage and into said outlet passage as said stem is rotated.

12. A selector valve as defined in claim 11, in which:
(d) said metering means includes a removable metering tip providing said metering passage of predetermined size.

* * * * *